United States Patent
Hintz

(10) Patent No.: US 7,545,376 B2
(45) Date of Patent: Jun. 9, 2009

(54) INTERACTIVE CLOSED-LOOP DATA ENTRY WITH REAL-TIME GRAPHICAL FEEDBACK

(75) Inventor: Kenneth J. Hintz, Fairfax Station, VA (US)

(73) Assignee: George Mason Intellectual Properties, Inc., Fairfax, VA (US)

(*) Notice: Subject to any disclaimer, the term of this patent is extended or adjusted under 35 U.S.C. 154(b) by 498 days.

(21) Appl. No.: 11/294,426

(22) Filed: Dec. 6, 2005

(65) Prior Publication Data

US 2006/0123054 A1 Jun. 8, 2006

Related U.S. Application Data

(60) Provisional application No. 60/632,989, filed on Dec. 6, 2004.

(51) Int. Cl.
*G06T 11/20* (2006.01)
(52) U.S. Cl. .................................................. 345/440
(58) Field of Classification Search ................. 345/440
See application file for complete search history.

(56) References Cited

U.S. PATENT DOCUMENTS

| | | | | |
|---|---|---|---|---|
| 5,175,710 | A | * | 12/1992 | Hutson .................. 367/135 |
| 6,801,878 | B1 | | 10/2004 | Hintz et al. |
| 6,907,304 | B1 | | 6/2005 | Hintz et al. |
| 2003/0107575 | A1 | * | 6/2003 | Cardno .................. 345/440 |
| 2004/0196287 | A1 | * | 10/2004 | Wong et al. ............ 345/440 |
| 2005/0052474 | A1 | * | 3/2005 | Cardno .................. 345/690 |

OTHER PUBLICATIONS

Hintz, Andrew S. Mūglē: User's Manual Version 1.0, George Mason University, Dec. 1, 2004.*
K. J. Hintz, and G. McIntyre, "Goal Lattices for Sensor Management,"Proceedings Signal Processing, Sensor Fusion, and Target Recognition VIII, 1999 SPIE International Symposium on Aerospace/Defense Sensing & Control, vol. 3720, pp. 249-255, Orlando, FL, Apr. 5-7, 1999.
K. J. Hintz, "GMUGLE: A Goal Lattice Constructor," Proceedings Signal Processing, Sensor Fusion, and Target Recognition X, 2001 SPIE International Symposium on Aerospace/Defense Sensing & Control, Orlando, FL, Apr. 2001.
K. J. Hintz and A. S. Hintz, "Creating Goal Lattices with GMUGLE," Proceedings Signal Processing, Sensor Fusion, and Target Recognition XI, 2002 SPIE International Symposium on Aerospace/Defense Sensing & Control, Orlando, FL, Apr. 2002.
K. J. Hintz and A. S. Hintz, Creating Goal Lattices with GMUGLE , Power Point Presentation given at 2002 SPIE International Symposium on Aerospace/Defense Sensing & Control, Orlando, FL, Apr. 2002.

* cited by examiner

*Primary Examiner*—Kee M Tung
*Assistant Examiner*—Jeffrey J Chow
(74) *Attorney, Agent, or Firm*—David G. Grossman

(57) ABSTRACT

Disclosed is an interactive closed loop data entry mechanism with real-time graphical feedback. The mechanism includes a spatial display processor, a graphical feedback mechanism, an entry interface, a value updater, and a connected-system-interface.

23 Claims, 5 Drawing Sheets

INTERACTIVE CLOSED-LOOP DATA ENTRY WITH REAL-TIME GRAPHICAL FEEDBACK

CROSS-REFERENCE TO RELATED APPLICATIONS

This application claims the benefit of U.S. Provisional Application No. 60/632,989, filed Dec. 6, 2004, by Hintz, entitled "GUI Spline," which is hereby incorporated by reference in its entirety.

BRIEF SUMMARY OF THE INVENTION

In accordance with the invention as embodied and broadly described herein, it is an interactive closed loop data entry mechanism with real-time graphical feedback. The mechanism includes a spatial display processor, a graphical feedback mechanism, an entry interface, a value updater, and a connected-system-interface.

A further aspect of the invention includes a tangible computer readable medium containing an interactive closed loop data entry computer program with real-time graphical feedback. A closed spline is derived from a multiplicity of functionally related values. The multiplicity of functionally related values distributed onto radials about a central point, the closed spline, and a feedback point are mapped to a graphical output device. The multiplicity of functionally related values are in a multidimensional space. The multidimensional space may be bounded by a multidimensional volume which is spanned by a set of basis vectors. Additionally, the multiplicity of functionally related values may be updated radially using a received input value that is associated with the feedback point. At least one of the multiplicity of functionally related values is outputted to a connected system. The closed spline may define a perimeter used to mask portions of a collocated diagram. The collocated diagram may be a chromaticity diagram.

A further aspect of the invention is a tangible computer readable medium containing an interactive closed loop data entry computer program with real-time graphical feedback. A multiplicity of functionally related values are mapped to a multidimensional space. A functional curve is derived from the multiplicity of functionally related values. At least a subset of the mapped multiplicity of functionally related values and a feedback point are outputted to a graphical output device. An input value associated with the feedback point is received by an entry interface.

The multiplicity of functionally related values are updated using the received input value. At least one of the multiplicity of values is outputted to a connected system.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF THE SEVERAL VIEWS OF THE DRAWINGS

The accompanying drawings, which are incorporated in and form a part of the specification, illustrate an embodiment of the present invention and, together with the description, serve to explain the principles of the invention.

DETAILED DESCRIPTION OF THE INVENTION

The present invention is an interactive closed loop data entry mechanism with real-time graphical feedback. A closed loop system is one in which there is a portion of the output signal which is fed back to the input of the system in order to improve system performance. In this case, the feedback to the user is a graphical display of the data which is being entered or the results of some computation on that data. Interactive means that a user can almost simultaneously enter data and receive visual feedback indicating the value entered. Real-time means that there is minimal transport lag between the time the data is entered and it is graphically displayed for the user.

Figure 1:
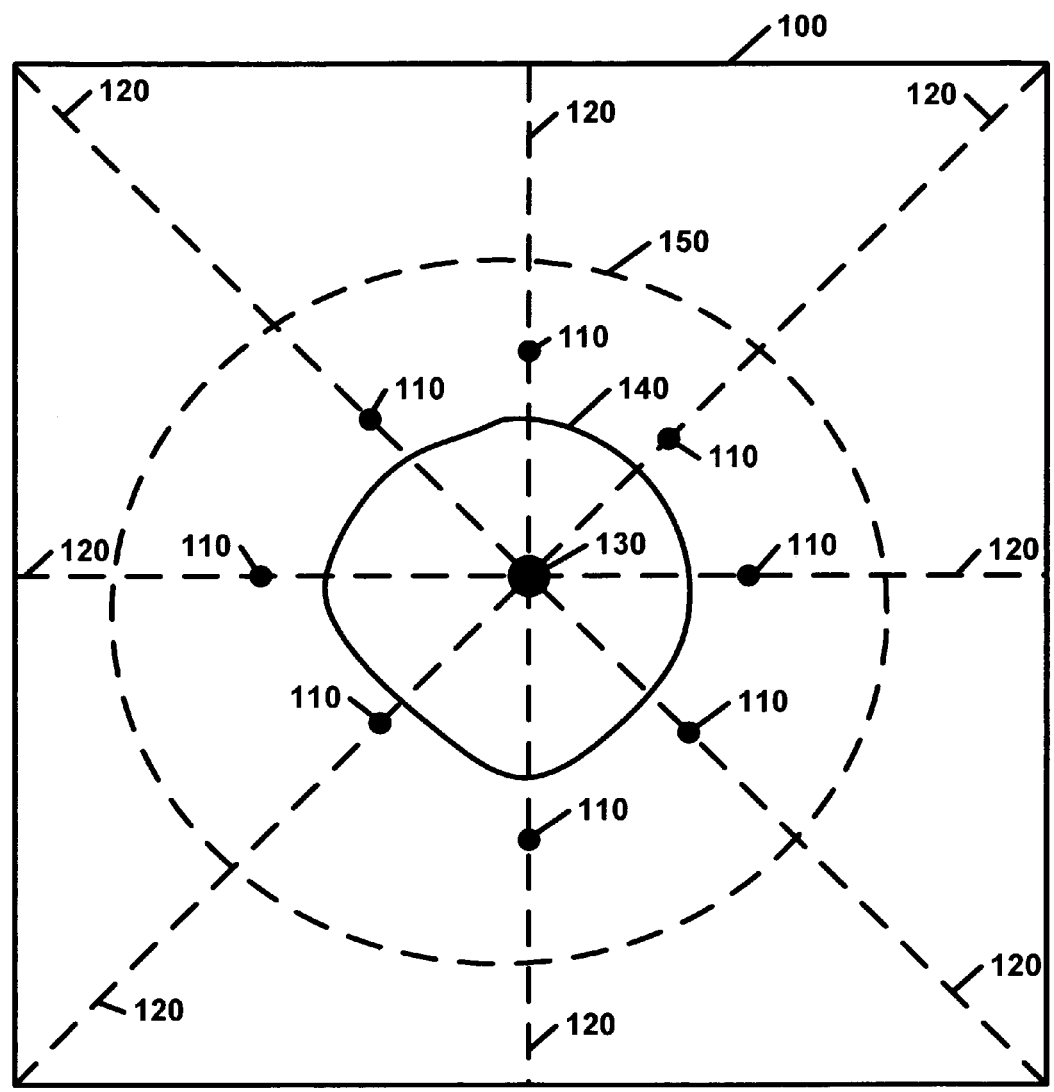
FIG. 1 shows an exemplary diagram of a goal value display generated using an aspect of an embodiment of the present invention.

FIG. 1 shows an exemplary diagram of a goal value display generated using an aspect of a first embodiment of the present invention. As shown, the graphical user interface maps n functionally related values 110 onto n radials 120 evenly distributed about a central point 130. "Functionally related" means that the data values are not independent. The relation among the data can be loose (e.g., relative values of the data must be within some bound), the relation can be bounded (e.g., the sum cannot exceed a particular amount), the relation can be correlated (e.g., increasing one value can result in the proportional increase of all other values) or anticorrelated (e.g., increasing one value can result in the proportional increase of all other values).

"Mapped to a multidimensional space" means that the values are visually represented as symbols whose position on an axis are determined from the value. While any multidimensional representation can be used for the graphical display of the values of the data elements, this embodiment uses the simple and convenient form of placing them on radial lines emanating from a point. The value of the data element in this case may be represented by the distance of the symbol from an origin. Hence, small values of a data element are represented by the symbol being close to the central point and large values are represented by the symbol being far from the central point. The converse mapping could also be used where the smallest values are mapped to an encompassing circle with the largest value in the center. This may be of particular value when there are a multiplicity of small values as they are maximally spread out and easier to manipulate.

A spline 140 may be fit to the n points 110 producing a closed perimeter which passes near each of the n points 110. A spline is a line which is fit to a set of points in accordance with some objective criteria. In general, there is no requirement for a spline to have its endpoint connected to its start point. A closed spline is one whose end point and start point are the same. This may form a closed area or volume.

This closed perimeter 140 may be used to mask the portions of a collocated chromaticity diagram 150 whose area extends beyond the perimeter 140. In stressing environments, it is sometimes difficult to visually interpret the spatial and numerical relationship among individual symbols. In order to make the task easier, the closed perimeter 140 can be used to overlay and obscure the regions of an (conceptually) underlying diagram. In this embodiment the diagram may be a colored diagram. A chromaticity diagram is a graphical representation of the full range of colors as characterized by their hue, saturation, and intensity (HSI). This particular type of color underlay shows different colors when values take on unique values by unmasking different portions of the diagram (i.e., as the relative values of the data change, different colored parts of the chromaticity diagram are shown leading to a unique visual perception).

A mouse can be used to grab each of the n points 110 individually and move them radially in or out. A mouse is a handheld pointing device for computers, involving a small object fitted with one or more buttons and shaped to sit naturally under the hand. The underside of the mouse houses a device that detects the mousers motion relative to the flat surface on which it sits. The mouse's 2D motion is typically translated into the motion of a cursor on the display. On button release, the perimeter 140 may be recomputed by adjusting the other n-1 points according to some functional relation among all n points 140. (e.g., all the values of the n points sum to 1. If one is increased, the other n−1 points are decreased proportional to their value prior to adjusting the one's value. There can be any functional relation among the n points 110.) The new perimeter 140 then changes the mask and the portion of the chromaticity diagram 150 which is presented to the user changes, thereby making an easy visualization of the relative contributions of the n points 110 both in terms of color content as well as in the shape of the perimeter.

Figure 2:
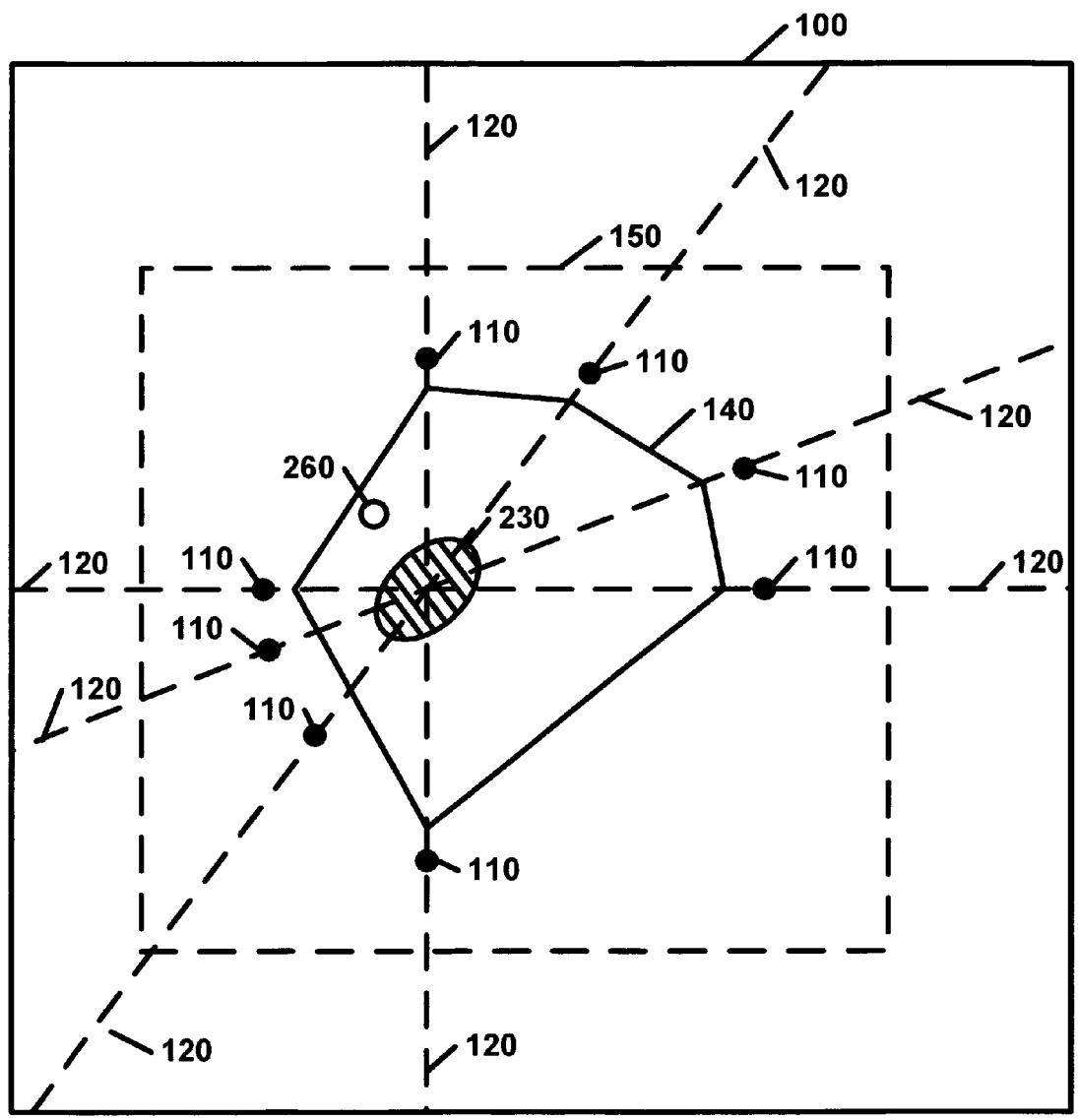
FIG. 2 shows an exemplary diagram of a goal value display generated using an aspect of an embodiment of the present invention.

One skilled in the art will recognize that many variations may be made to this first embodiment, some of which will be described here, some of which are shown in a second embodiment illustrated in FIG. 2. First, the graphical user interface maps all or subsets of the n functionally related values 110. Second, the mapping may be onto radials 120 unevenly. These uneven distributions could be linear or non-linear, formulaic or random, predetermined or dynamically determined. Third, central point 130 could be placed in a non-central location. Additionally, point 130 could be represented by an area 230 rather than a point. Fourth, perimeter 140 could be based upon a function other a spline such as a piece-wise linear function. The collocated diagram 150 could be other than a chromaticity diagram. For example, a grey scale diagram, a texture (e.g., with different optical densities as a function of radial distance from the central point), or a meaningful image (e.g., a symbol of whether a component of the system is enabled or disabled). Fifth, the device used to grab a point 110 could other than a mouse. For example it could be a tablet, a touchpad, a touchscreen, a track ball, a graphics input system that records x, y and z coordinates of a real object, or the like. Sixth, an embodiment could provide for grabbing a feedback point 260 that is not one of the points 110. Seventh, the perimeter 140 could be computed according to a non-linear formula. The modifications and variations just described in this paragraph are not intended to be limiting, but rather to provide examples of how one skilled in the art could create new embodiments to the claimed invention by introducing obvious variations to the claimed elements.

Figure 3:
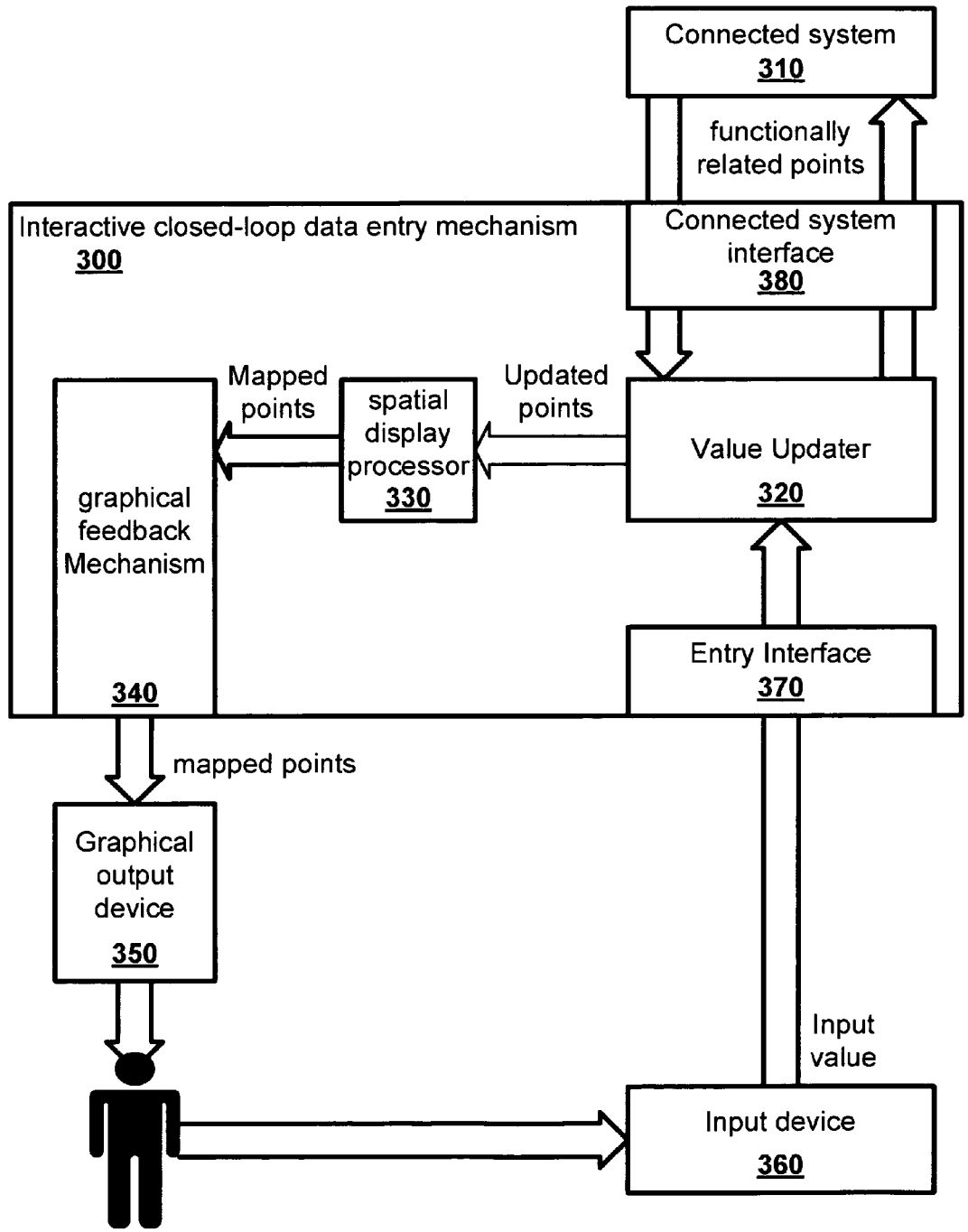
FIG. 3 shows block diagram of an embodiment of the present invention.

A third embodiment of the present invention is shown in FIG. 3. This figure shows a block diagram of an interactive closed loop data entry mechanism 300 with real-time graphical feedback. The mechanism 300 includes a spatial display processor 330, a graphical feedback mechanism 340, an entry interface 370, a value updater 320, and a connected-system-interface 380.

The spatial display processor 330 is preferably configured to map a multiplicity of functionally related values to a multidimensional space, the multiplicity of functionally related values originating from a connected system 310. The spatial display processor 330 may be a spline-processor. A "spline processor" is one which computes a spline fit to a set of data values. There are various methods of computing a "spline" fit. The particular method for fitting the data is not important to the invention claimed here.

A "connected system" is a system or process which needs to be controlled or whose behavior can be affected by a change in data element values related to the system. The system may control itself through additional internal feedback mechanisms with the present system being used to enter parametric data for that control process. A connected system may be as simple as a budget held in a spreadsheet with the data elements being the individual budget "line items" which are to be adjusted or as complex as an optimal control system whose performance index values are entered through the embodiments of the present invention and manipulated in real time while the optimal control system is operating. The connected system may also be a goal lattice. A goal lattice relates to methods and apparatus for measuring a relative utility for each of a plurality of goals which comprise a system objective and may be used to determine the way a system behaves. An example of a goal lattice may be found in U.S. Pat. No. 6,907,304, entitled "Method and Apparatus of Measuring a Relative Utility for Each of Several Different Tasks Based On Identified System Goals."

The mapping of the multiplicity of functionally related values may include evenly distributing the multiplicity of functionally related values about a central point on n radials.

The graphical feedback mechanism interface 340 is preferably and operationally configured to output to a graphical output device 350: at least a subset of the mapped multiplicity of functionally related values, and a feedback point. The feedback point may be one of the mapped multiplicity of functionally related values.

A graphical output device 350 is a device which displays the mapped data in a form which can be easily interpreted by the user. It can be visual as in the case of a conventional computer monitor (such as a CRT or LCD based device) or it could be tactile as in the case of a "Braille-like" output, or audible in the case of different tones or variations in the frequency about a central tone either unique to each data element or adjusted to the current data element value when it is selected and then varied about that tone.

The entry interface 370 is preferably and operationally configured to receive an input value associated with the feedback point from an input device 360. An input device 360 may be a device which senses some physical property controlled by the user and translates it into a form which can be manipulated by the system. The physical property controlled by the user could be spatial (e.g., as in hand or finger position), force (e.g. how hard a force sensing device is compressed), or audible (e.g., the loudness of a vocalization or its pitch). Examples of such devices include but are not limited to a computer mouse, a touchpad, a touchscreen, a trackball, a 3-d digitizer, or a combination of the above.

Alternatively the input device 360 could be a computer. Devices that may be used with a computer-to-computer interface include but are not limited to embedded computer systems, control analysis systems or the like.

The value updater 320 preferably updates the multiplicity of functionally related values using the input value. Once the multiplicity of functionally related values are updated, a connected system interface 380 may be used to output at least one of the multiplicity of functionally related values to a connected system 310. Which of the functionally related values is outputted to the connected system 310 may depend upon the connected system 310 itself and how each of the functionally related values is associated to the system 310.

The connected system 310 may be a system such as a goal lattice, a vehicle, a spreadsheet, a resource management system, or a plant. A goal lattice relates to methods and apparatus for measuring a relative utility for each of a plurality of goals which comprise a system objective. In the context of this disclosure, a vehicle can be any movable object controlled by control system. Examples of vehicles include robots, planes, machines, etc. A spreadsheet is a rectangular table (or grid) of information, often financial information. A resource management system is one which controls various resources in an attempt to meet some measurable performance criteria. A plant is a system to be controlled either open or closed loop. A plant is usually expressible as a linear or nonlinear transfer function in Laplace or discrete transform space.

The spatial display processor 330 may map all or a subset of the multiplicity of functionally related values using a mapping function. The mapping function may be a function chosen to enhance the visual understanding of the values. For example, the function may be a spline function, a spline function, a piecewise linear function, a vector function, a radial mapping function, or a combination of functions. It is anticipated that other functions, both linear and non-linear may also be used.

The multidimensional space may be bounded by a multidimensional volume that is spanned by a set of basis vectors. A set of basis vectors is the minimum number of dimensions which are required to represent any particular value in a space. The number of basis vectors may be smaller than the number of data elements whose values are being manipulated.

The multiplicity of functionally related values are distributed onto radials about an origin.

The mapped multiplicity of functionally related values can define a perimeter that may be used to mask portions of a collocated diagram. The collocated diagram may be a diagram that preferably enhances the interpretation of the multitude of functionally related points. A chromaticity diagram is an example of such an enhancing diagram.

The mechanism may also include a constraint overlay which defines limits on at least one of the multiplicity of functionally related values. A constraint overlay can be a marking which indicates (visually or otherwise) to the user the bound that a value can take on (e.g., a tone could be sounded when a bound is exceeded) or a penalty associated with selecting certain values or ranges of values. One way to implement a constraint overlay is to form translucent graphical wedges about each radial line representing a data element, however, other indicators such as in the form of limit lines or colors are also suitable for indicating data value constraints.

Additionally, the constraint overlay may apply a relation among the data values. The relation could be a very weak coupling, in the form of constraints on the sum of the data (e.g., a financial budget), the total power (e.g., the sum of the square of the data), or a minimum or maximum value of individual data values (e.g., the minimum mortgage payment in a budget). Another example of a mathematical constraint comes from a physical constraint such as the bounded movement of a robotic element. Not all robotic elements which are physically connected can move through all ranges of motion and this can be expressed mathematically and taken into account in the entry of data values.

Figure 4:
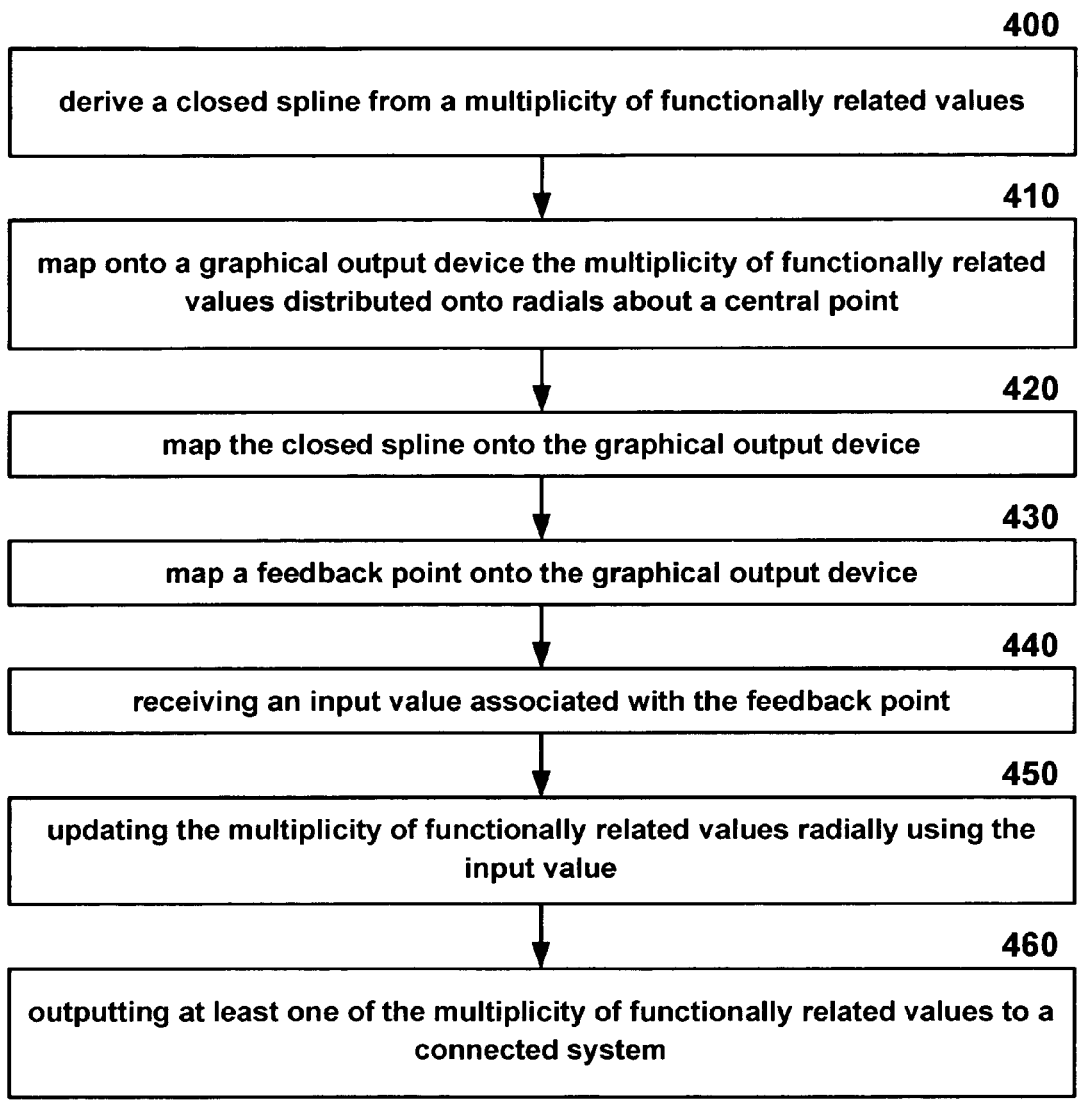
FIG. 4 shows a flow diagram of an aspect of an embodiment of the present invention.
Figure 5:
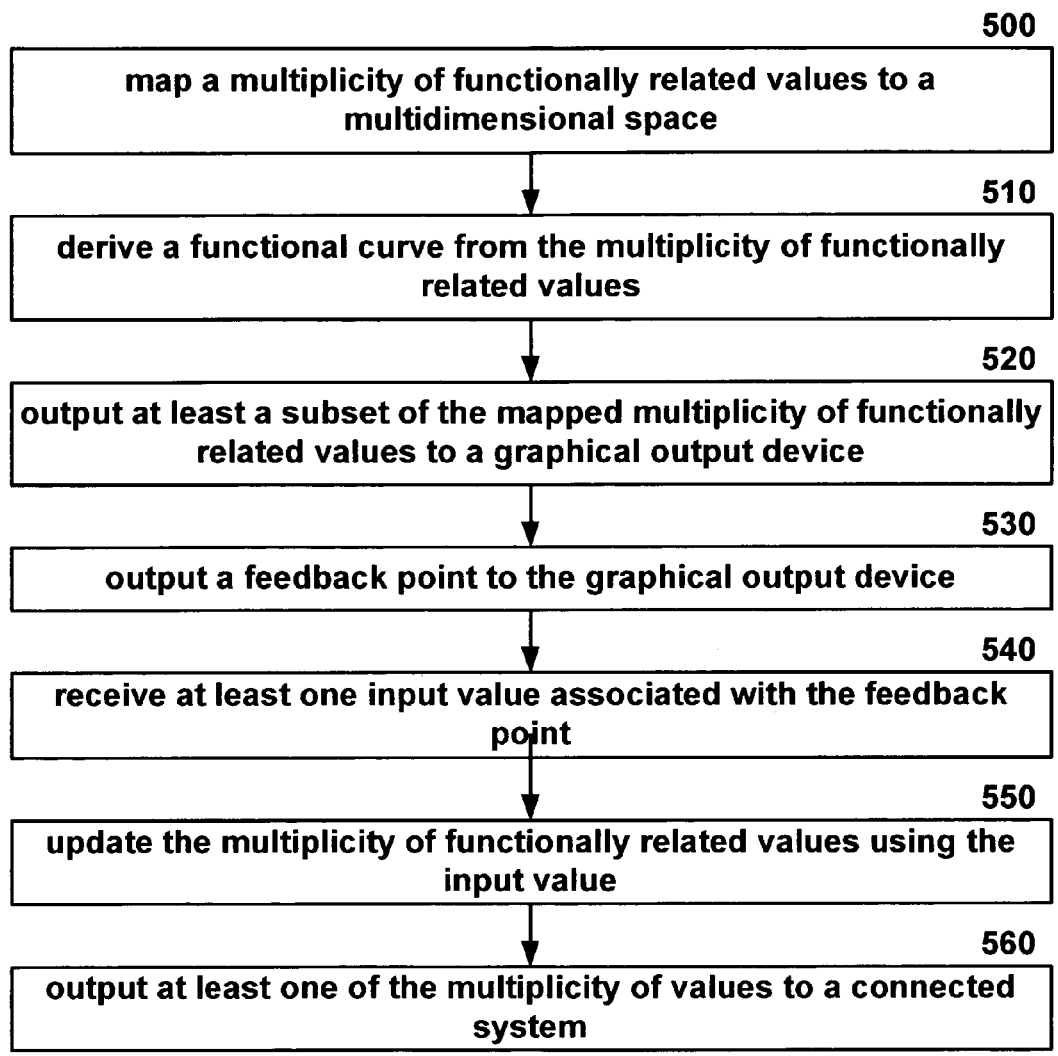
FIG. 5 shows an exemplary diagram of a display generated using an aspect of an embodiment of the present invention.

FIGS. 4 and 5 show flow diagrams of varying aspects of the present invention. These embodiments may be realized as computer programs for enabling interactive closed loop data entry with real-time graphical feedback. These programs should include instructions that when executed by one or more processors cause the one or more processors to execute instructions to perform steps shown in FIGS. 4 & 5 and described herein.

Referring to FIG. 4, we see steps for a fourth embodiment. A closed spline is derived from a multiplicity of functionally related values at step 400. At step 410, the multiplicity of functionally related values are distributed onto radials about a central point and mapped to a graphical output device. Similarly, the closed spline and a feedback point are mapped to a graphical output device at steps 420 and 430 respectively. Preferably, the multiplicity of functionally related values reside in a multidimensional space and the multidimensional space is bounded by a multidimensional volume which is spanned by a set of basis vectors. An input value that is associated with the feedback point is received at step 440. The multiplicity of functionally related values may be then be updated radially using the input value at step 450. At least one of the multiplicity of functionally related values may then be outputted to a connected system at step 460. The closed spline may define a perimeter used to mask portions of a collocated diagram. The collocated diagram may be a chromaticity diagram.

Referring to FIG. 5, we see steps for a fifth embodiment. At step 500, a multiplicity of functionally related values are mapped to a multidimensional space. At step 510, a functional curve is derived from the multiplicity of functionally related values. The functional curve may be a spline, a closed spline, or other curve that adds understanding to the functionally related points. The functional curve may also define a perimeter used to mask portions of a collocated diagram such as a chromaticity diagram.

At least a subset of the mapped multiplicity of functionally related values are outputted to a graphical output device at step 520 and a feedback point outputted to the graphical output device at step 530. One of the methods of mapping of the values may include distributing them onto radials about a central point. In this situation, it may be advantageous to provide for at least some of the values to be adjusted radially. One way to provide for radial adjustment of a value can be to let a data element's value change accordingly while a functional curve (such as a closed spline) is redrawn in real-time in response to an interactive cursor selection and adjustment of a symbol on a radial line. The feedback point may be one of the multiplicity of functionally related values or an independent point. Optionally, the functional curve may be outputted to the graphical output device. At step 540, at least one input value associated with the feedback point is received. The multiplicity of functionally related values may then be updated using the input value. Finally, at step 560, at least one of the multiplicity of values to a connected system.

The foregoing descriptions of the preferred embodiments of the present invention have been presented for purposes of illustration and description. They are not intended to be exhaustive or to limit the invention to the precise forms disclosed, and obviously many modifications and variations are possible in light of the above teaching. The illustrated embodiments were chosen and described in order to best explain the principles of the invention and its practical application to thereby enable others skilled in the art to best utilize the invention in various embodiments and with various modifications as are suited to the particular use contemplated.

What is claimed is:

1. A tangible computer readable medium containing an interactive closed loop data entry computer program with real-time graphical feedback, wherein the computer program includes instructions that when executed by one or more processors causes the one or more processors to execute instructions to perform the steps of:
   a) deriving a closed spline from a multiplicity of functionally related values, the multiplicity of functionally related values being in a multidimensional space, the multidimensional space bounded by a multidimensional volume, the multidimensional volume spanned by a set of basis vectors;
   b) mapping to a graphical output device:
      i) the multiplicity of functionally related values distributed onto radials about a central point;
      ii) the closed spline; and
      iii) a feedback point;
   c) receiving an input value associated with the feedback point;
   d) updating the multiplicity of functionally related values radially using the input value; and
   e) outputting at least one of the multiplicity of functionally related values to a connected system; and
   wherein the closed spline defines a perimeter used to mask portions of a collocated diagram, the collocated diagram being a chromaticity diagram.

2. An interactive closed loop data entry mechanism with real-time graphical feedback, comprising:
   a) a spatial display processor configured to map a multiplicity of functionally related values to a multidimensional space, the multiplicity of functionally related values originating from a connected system;
   b) a graphical feedback mechanism interface configured to output to a graphical output device:
      i) a subset of the mapped multiplicity of functionally related values; and
      ii) a feedback point;
   c) an entry interface configured to receive an input value associated with the feedback point;
   d) a value updater configured to update the multiplicity of functionally related values using the input value; and
   e) a connected-system-interface configured to output at least one of the multiplicity of functionally related values to a connected system.

3. A mechanism according to claim 2, wherein the spatial display processor maps a subset of the multiplicity of functionally related values using at least one of the following:
   a) a spline function;
   b) a piecewise linear function;
   c) a vector function; or
   d) a radial mapping function; or
   e) a combination of the above.

4. A mechanism according to claim 2, wherein the multidimensional space is bounded by a multidimensional volume spanned by a set of basis vectors.

5. A mechanism according to claim 3, wherein the spline function is a closed spline function.

6. A mechanism according to claim 2, wherein the multiplicity of functionally related values are distributed onto radials about an origin.

7. A mechanism according to claim 2, wherein the mapped multiplicity of functionally related values defines a perimeter used to mask portions of a collocated diagram.

8. A mechanism according to claim 2, wherein the mapped multiplicity of functionally related values defines a perimeter used to mask portions of a collocated chromaticity diagram.

9. A mechanism according to claim 2, wherein the input value is received from at least one of the following:
   a) a computer;
   b) a mouse;
   c) a touchpad;
   d) a touchscreen;
   e) a trackball; or
   f) a 3-d digitizer.

10. A mechanism according to claim 2, wherein the connected system is one of the following:
    a) a goal lattice;
    b) a vehicle;
    c) a spreadsheet;
    d) a resource management system; or
    e) a plant.

11. A mechanism according to claim 2, further including a constraint overlay, the constraint overlay defining limits on at least one of the multiplicity of functionally related values.

12. A tangible computer readable medium containing an interactive closed loop data entry computer program with real-time graphical feedback, wherein the computer program includes instructions that when executed by one or more processors causes the one or more processors to execute instructions to perform the steps of:
    a) mapping a multiplicity of functionally related values to a multidimensional space;
    b) deriving a functional curve from the multiplicity of functionally related values;
    c) outputting to a graphical output device:
       i) at least a subset of the mapped multiplicity of functionally related values; and
       ii) a feedback point;
    d) receiving at least one input value associated with the feedback point;
    e) updating the multiplicity of functionally related values using the input value; and
    f) outputting at least one of the multiplicity of values to a connected system.

13. A tangible computer readable medium according to claim 12, wherein the multidimensional space is bounded by a multidimensional volume spanned by a set of basis vectors.

14. A tangible computer readable medium according to claim 12, further including outputting the functional curve to the graphical output device.

15. A tangible computer readable medium according to claim 12, wherein the functional curve is a spline.

16. A tangible computer readable medium according to claim 12, wherein the functional curve is a closed spline.

17. A tangible computer readable medium according to claim 12, wherein the multiplicity of functionally related values are distributed onto radials about a central point.

18. A tangible computer readable medium according to claim 12, wherein the functional curve defines a perimeter used to mask portions of a collocated diagram.

19. A tangible computer readable medium according to claim 12, wherein the functional curve defines a perimeter used to mask portions of a collocated chromaticity diagram.

20. A tangible computer readable medium according to claim 12, wherein the input value is received from one of the following:
    a) a computer;
    b) a mouse;
    c) a touchpad;
    d) a touch screen;
    e) a trackball; or
    f) a 3-d digitizer.

21. A tangible computer readable medium according to claim 12, wherein the connected system is one of the following:
   a) a goal lattice;
   b) a vehicle;
   c) a spreadsheet;
   d) a resource management system; or
   e) a plant.

22. A tangible computer readable medium according to claim 12, further including a constraint overlay, the constraint overlay defining limits on at least one of the multiplicity of values.

23. A tangible computer readable medium according to claim 12, further including the step of adjusting at least one of the multiplicity of values radially.

* * * * *